J. Warner.
Lid Lifter.
No. 31,198. Patented Jan. 22, 1861.
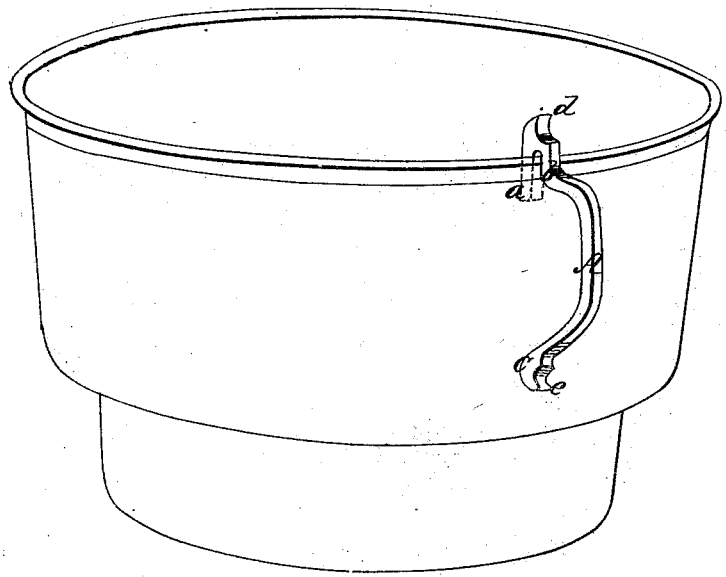 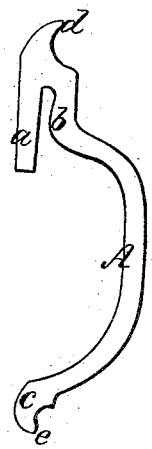
Witnesses:
J. W. Coombs
R. S. Spencer
Inventor:
Joseph Warner
per Munn & Co
Attorneys

UNITED STATES PATENT OFFICE.

JOSEPH WARNER, OF NEW BRITAIN, CONNECTICUT.

KETTLE-HANDLE.

Specification of Letters Patent No. 31,198, dated January 22, 1861.

*To all whom it may concern:*

Be it known that I, JOSEPH WARNER, of New Britain, in the county of Hartford and State of Connecticut, have invented a new and useful Handle for Kettles; and I do hereby declare that the following is a full, clear, and exact description thereof, reference being had to the accompanying drawings, making a part of this specification, in which—

Figure 1 is a side view of the improved kettle-handle. Fig. 2 is a perspective view of the handle showing its application to a kettle.

Similar letters of reference indicate corresponding parts in both figures.

To many varieties of metallic kettles or boilers which are used in the culinary department handles are very objectionable, particularly such handles as are soldered or riveted to the sides of the vessels.

The object of this invention is to furnish a handle which may be readily attached to or detached from such kettles and which will answer every purpose of the ordinary handles which are fixed permanently to the kettles.

To enable those skilled in the art to make and use my invention I will proceed to describe its construction and operation.

The form of my improved metal kettle handle is fully illustrated in the drawings, and also the manner in which it is applied to an ordinary metal stove boiler. The boiler has a round wire edge that is formed by turning the edge of the boiler over a round wire. The edges of nearly all of such vessels are formed in this way and it is to such vessels with such edges that my invention is especially applicable.

The handle represented in Figs. 1 and 2 has a curved holding portion A made sufficiently large to be grasped and held tightly in the hand without bringing the back of the hand in contact with the side of the vessel to which the handle is applied. On the upper end of this curved handle a hooked clamping portion is formed, which consists of a straight tongue $a$, and a curved shoulder $b$, that forms with the tongue $a$, a slot which is somewhat wider at its upper end than it is at its lower end, so that the edge of the vessel will fit tightly into the slot. The lower end $c$, of the handle A, is curved and has a wedge shaped lip $e$, formed on it which may be used for lifting the cover from the vessel by pushing it under the edge of the cover. The upper end of the handle has another curved wedge projection $d$, which is used for the same purpose as $e$.

The handle above described is cast of brass, or iron or any suitable metal, and it is used in the following manner: The cover of the vessel to be moved is lifted up by one of the wedges $d$ or $e$, and the slotted end of the handle is pushed sidewise under the cover until the tongue $a$, and shoulder $b$, can be forced down over the edge of the vessel, forcing the edge of the vessel into the slot in the handle. The handle is held in an oblique position during this movement. Afterward the lower end of the handle is moved down so as to place the handle in a vertical position. The vessel may now be lifted and removed to another place, taking care to incline the vessel slightly so that the tongue $a$, will have a firmer hold. The contents of the vessel may thus be poured out, and the handle will still retain its hold without the least liability to become detached. To detach the handle its lower end should be moved sidewise toward the edge of the vessel.

The advantages of my improved handle are that it will never get hot as it is not exposed to the heat of the stove, it will answer every purpose of the permanent handles and its use will render permanent handles for small stove boilers unnecessary.

Having thus described my invention, I claim as an improved article of manufacture—

A handle for lifting vessels that is composed of a curved portion A having a tongue and shoulder $a$, $b$ at its upper end which form a slot to grasp the edge of the vessel, the whole made as herein shown and described.

JOSEPH WARNER.

Witnesses:
MARCELLUS CLARK,
WM. H. BELDEN, Jr.